United States Patent
Lindoff et al.

(10) Patent No.: US 8,897,780 B2
(45) Date of Patent: Nov. 25, 2014

(54) MANAGING ENERGY CONSUMPTION OF BASE STATIONS

(75) Inventors: Bengt Lindoff, Bjärred (SE); Bo Hagerman, Tyresö (SE); Pål Frenger, Linköping (SE); Stefan Parkvall, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 75 days.

(21) Appl. No.: 13/256,065

(22) PCT Filed: Mar. 13, 2009

(86) PCT No.: PCT/SE2009/050263
§ 371 (c)(1),
(2), (4) Date: Sep. 12, 2011

(87) PCT Pub. No.: WO2010/104433
PCT Pub. Date: Sep. 16, 2010

(65) Prior Publication Data
US 2012/0004009 A1  Jan. 5, 2012

(51) Int. Cl.
*H04W 36/00* (2009.01)
*H04W 52/02* (2009.01)
*H04W 88/08* (2009.01)

(52) U.S. Cl.
CPC ...... *H04W 52/0232* (2013.01); *H04W 52/0206* (2013.01); *H04W 88/08* (2013.01)
USPC ........... 455/436; 455/437; 455/438; 455/439; 455/440; 455/441; 455/442; 455/443; 455/444; 455/446

(58) Field of Classification Search
CPC .......... H04W 84/045; H04W 52/0206; H04W 16/32; H04W 52/244; H04W 36/04; H04W 36/0055; H04W 16/08; H04W 36/0083; H04W 36/08; H04W 36/22; H04W 36/0061; H04W 36/00; H04W 36/0094; H04W 36/16; H04W 36/18; H04M 15/8038
USPC .......................................... 455/436–444, 446
See application file for complete search history.

(56) References Cited

U.S. PATENT DOCUMENTS 7,277,709 B2 * 10/2007 Vadgama ...................... 455/453
7,583,962 B2 *  9/2009 Nelson et al. ................. 455/424

(Continued)

FOREIGN PATENT DOCUMENTS

| EP | 1001555 A | 5/2000 |
|---|---|---|
| GB | 2446438 A | 8/2008 |
| WO | 0207464 A | 1/2002 |

OTHER PUBLICATIONS

3rd Generation Partnership Project. "Dynamic Setup for HNBs for Energy Savings and Interference Reduction," 3GPP TSG RAN WG3 Meeting #59bis, R3-080658, Shenzhen, China, Mar. 31-Apr. 3, 2008.

(Continued)

*Primary Examiner* — Liton Miah
(74) *Attorney, Agent, or Firm* — Coats & Bennett, PLLC

(57) ABSTRACT

A base station includes an emulation controller (20) configured to receive signals indicating that another base station in an active mode managing a cell, having a predetermined cell identity and coverage area, will go into an idle mode and no longer manage the cell, and to determine terminal activity in the cell. A baseband processing unit (18) is connected to the emulation controller (20) and configured to emulate the active mode of the other base station by taking over management of the cell, in at least part of its coverage area, using the same cell identity.

20 Claims, 13 Drawing Sheets

(56) References Cited

U.S. PATENT DOCUMENTS

| | | | |
|---|---|---|---|
| 8,032,083 B2* | 10/2011 | Mosker et al. | 455/41.2 |
| 2005/0130644 A1* | 6/2005 | Bassompierre et al. | 455/422.1 |
| 2006/0019665 A1* | 1/2006 | Aghvami et al. | 455/444 |
| 2007/0097939 A1* | 5/2007 | Nylander et al. | 370/338 |
| 2008/0285489 A1* | 11/2008 | Meier | 370/280 |
| 2009/0052395 A1* | 2/2009 | Bao et al. | 370/331 |
| 2009/0190555 A1* | 7/2009 | Oguchi | 370/331 |
| 2010/0056184 A1* | 3/2010 | Vakil et al. | 455/456.5 |
| 2010/0136979 A1* | 6/2010 | Yang et al. | 455/442 |
| 2010/0279696 A1* | 11/2010 | Voyer et al. | 455/440 |
| 2010/0311427 A1* | 12/2010 | Bouguen et al. | 455/446 |

OTHER PUBLICATIONS

3rd Generation Partnership Project. "Solution for interference Reduction SON Use Case," 3GPP TSG RAN WG3 Meeting #61bis, R3-081174, Kansas City, US, May 5-6, 2008.

* cited by examiner

DISTRIBUTED EMULLATION SYSTEM

CENTRALIZED EMULATION SYSTEM

MANAGING ENERGY CONSUMPTION OF BASE STATIONS

TECHNICAL FIELD

The present invention relates generally to managing energy consumption of base stations in a cellular network.

BACKGROUND

Energy consumption has long been an important issue for mobile terminals in cellular systems. Recent trends in green technology make it important to reduce the energy consumption also for the base stations (BS or NodeB, eNodeB) as the base station power consumption is a non-negligible part of the cost for the operator and excessive power consumption has a negative impact on the environment. Furthermore, the energy consumed as part of the base station operation generates heat, and active cooling (air conditioning) is typically required to control the temperature of the equipment. Active cooling will further add to the total energy consumption of a base station site. Unlike terminals, which can go into idle (or sleep) mode when they are not active, base stations need to transmit pilots, synchronization symbols and broadcast messages in order for camping terminals to be in sync with the network.

A prior art solution for reducing the overall energy consumption in the network is to, in case of low load (for instance during the night), let certain base stations go into an idle mode and rely on enlarged neighboring cells to serve the area normally covered by the now idle base station.

A drawback of the prior art solution is that when a number of terminals start to require significant amounts of resources, then the network does not have any information on which terminals should be handled by the active base stations and which terminals should be handled by the awakened base stations. Thus, it is not possible to tell whether awakening of one or more of the idle base stations would actually be of any help for the active base stations.

SUMMARY

An object of the present invention is a more efficient management of energy consumption of base stations in a cellular network This object is achieved in accordance with the attached claims.

A method in accordance with the present invention of operating a base station includes receiving signals indicating that another base station in an active mode managing a cell, having a predetermined cell identity and coverage area, will go into an idle mode and no longer manage the cell. It also includes determining terminal activity in the cell, and emulating the active mode of the other base station by taking over management of the cell, in at least part of its coverage area, using the predetermined cell identity.

A base station in accordance with the present invention includes an emulation controller configured to receive signals indicating that another base station in an active mode managing a cell, having a predetermined cell identity and coverage area, will go into an idle mode and no longer manage the cell, and to determine terminal activity in the cell. The base station also includes a baseband processing unit connected to the emulation controller and configured to emulate the active mode of the other base station by taking over management of the cell, in at least part of its coverage area, using the same cell identity.

A method in accordance with the present invention of operating a network unit controlling base stations in a cellular network includes determining that a base station in an active mode managing a cell, having a predetermined cell identity and coverage area, will go into an idle mode and no longer manage the cell. The method also includes determining terminal activity in the cell, and instructing at least one other base station to emulate the active mode of the first mentioned base station by taking over management of the cell, in at least part of its coverage area, using the predetermined cell identity.

A network unit in accordance with the present invention controlling base stations in a cellular network includes an emulation controller that determines that a base station in an active mode managing a cell, having a predetermined cell identity and coverage area, will go into an idle mode and no longer manage the cell, and signals identifying terminal activity in the cell. The network unit also includes connection data storage connected to the emulation controller and configured to store the cell identity and terminal activity in the cell. The emulation controller is configured to instruct at least one other base station to emulate the active mode of the first mentioned base station by taking over management of the cell, in at least part of its coverage area, using the predetermined cell identity.

An advantage of the present invention is that the emulated cell has the same cell identity as the cell it emulates. This means that traffic belonging to the cell can be distinguished from traffic belonging to other cells managed by a base station performing the emulation. This facilitates an improved trade-off between capacity and energy consumption.

BRIEF DESCRIPTION OF THE DRAWINGS

The invention, together with further objects and advantages thereof, may best be understood by making reference to the following description taken together with the accompanying drawings, in which.

DETAILED DESCRIPTION

For the purposes of the present application a base station is assumed to manage one or more radio cells. Thus, "base station" also refers to more recent entities, such as NodeB and eNodeB (evolved NodeB), which are capable of managing more than one cell.

Similarly, "terminal" will be used to indicate different types of radio terminals, such as mobile stations, UEs (User Equipments), laptops, etc.

Before the invention is described in more detail, the background of the invention will be briefly described.

Figure 1:
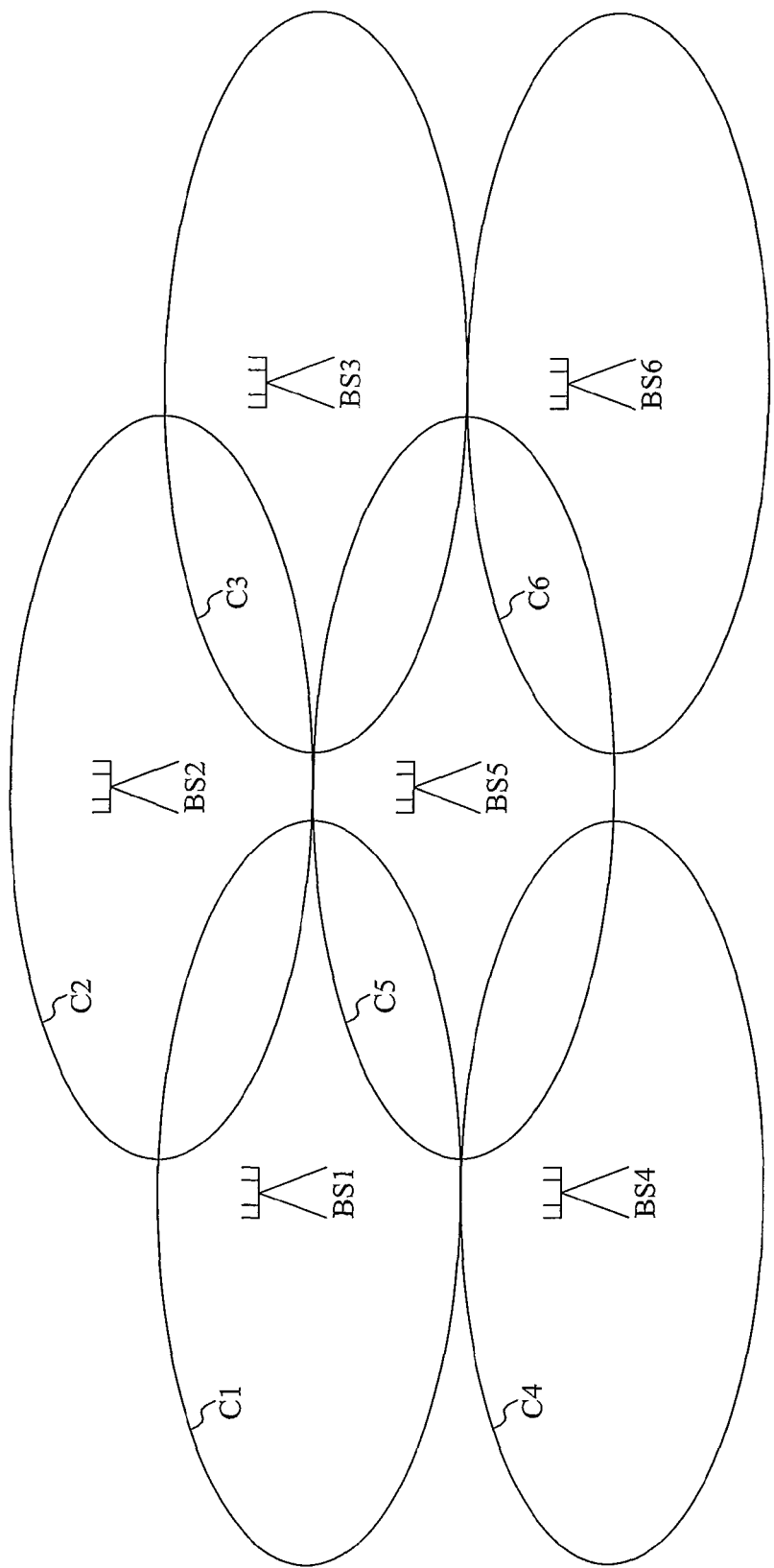
FIG. 1 a conceptual view illustrating a cellular network.
Figure 2:
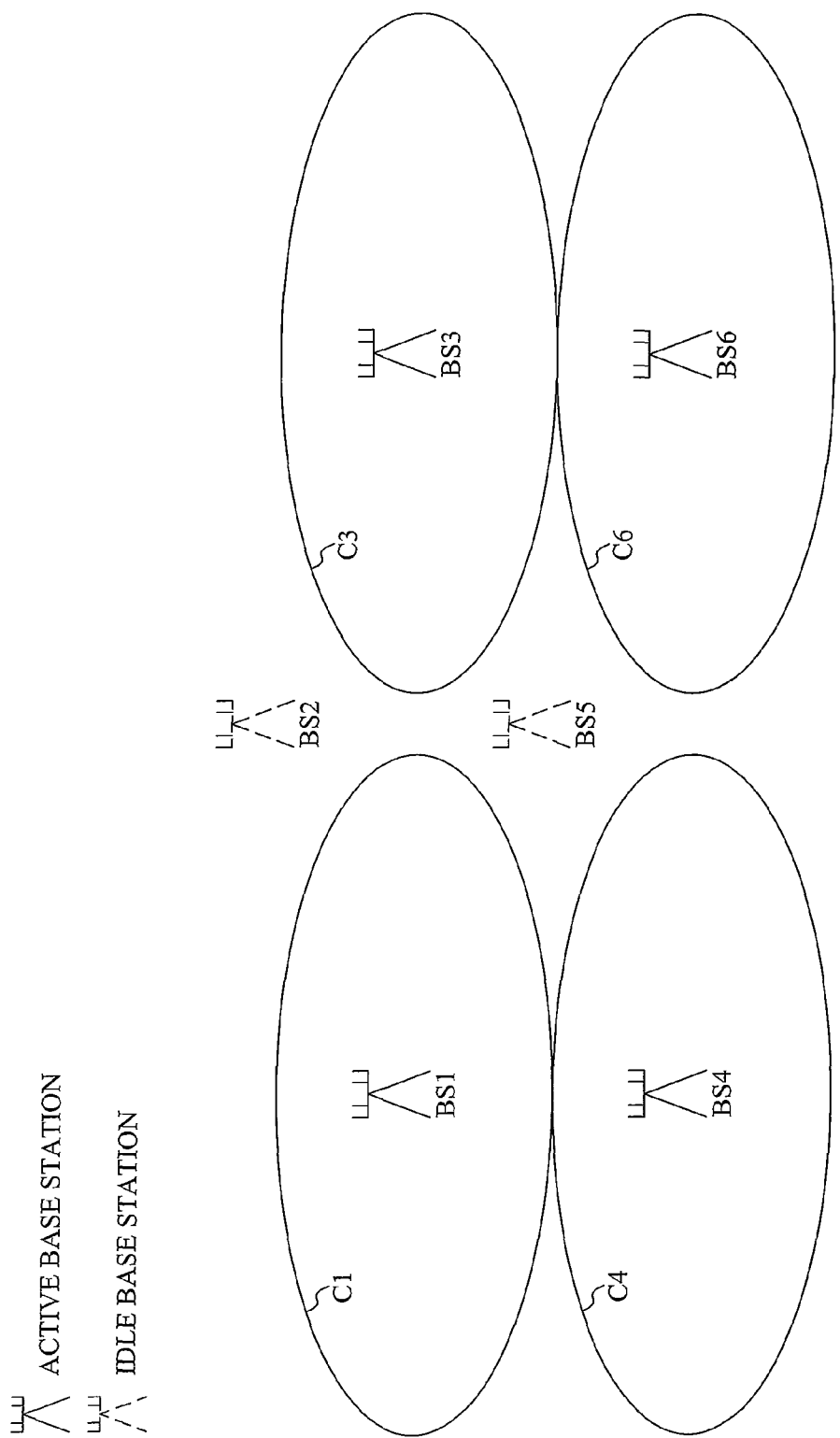
FIG. 2 a conceptual view illustrating the network in FIG. 1 with two base stations in idle mode.
Figure 3:
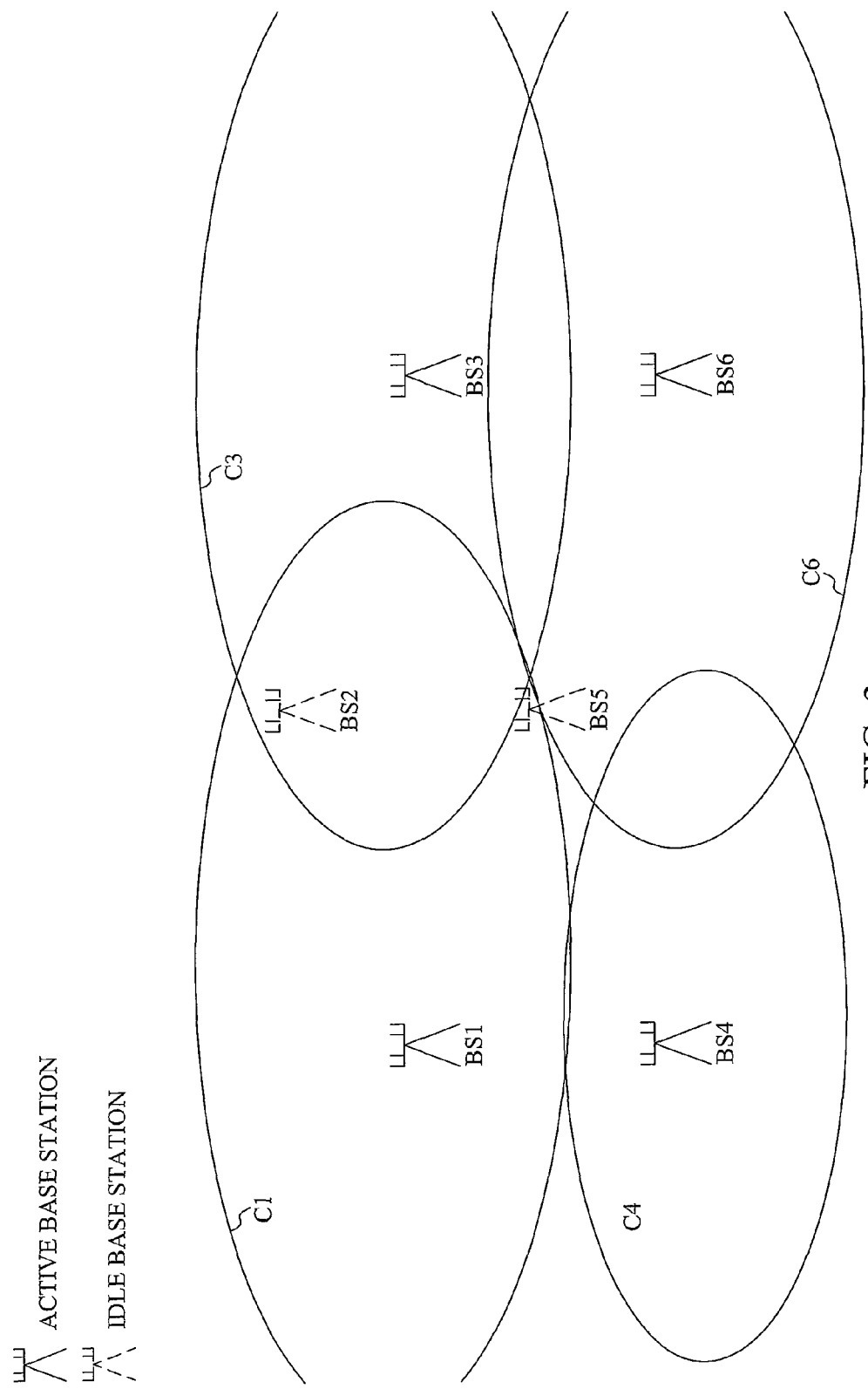
FIG. 3 a conceptual view illustrating a prior art technique to cover the area normally served by the idle base stations.

FIG. 1 is a conceptual view illustrating a cellular network. A number of active base stations BS1-BS6 manage corresponding radio cells C1-C6. During low traffic conditions, for example at night, it may be desirable to let some of the base stations, for example BS2 and BS5, go into an idle mode, in which no traffic is handled and the base station transceivers are turned off to save energy. Simply turning off the transceivers would result in the situation illustrated in FIG. 2 with "dead" areas not covered by any base station, which is unacceptable. A prior art solution to this problem is illustrated in FIG. 3. According to this solution the neighbor base stations enlarge their coverage area to jointly cover the "dead" areas by increasing their output power (in this and the following figures idle base stations will be indicated by dashed lines).

A drawback of the prior art solution is that terminals served by the enlarged cells (when some base stations are in idle mode) will use the cell identity of these cell (cells C1, C3, C4 and C6 in FIG. 3). This means that if the traffic load in one of these cells, for example C1 in FIG. 3, increases to such an extent that it would be desirable to wake up the corresponding idle base station, for example BS2 in FIG. 3, there is no way to know in advance which terminals that are in the area normally covered by the currently idle base station BS2 and which terminals that are in the area normally covered by the active base station BS1. Thus, it is not possible to tell whether awakening of the idle base station BS2 would actually be of any help for the active base station BS1.

Figure 4:
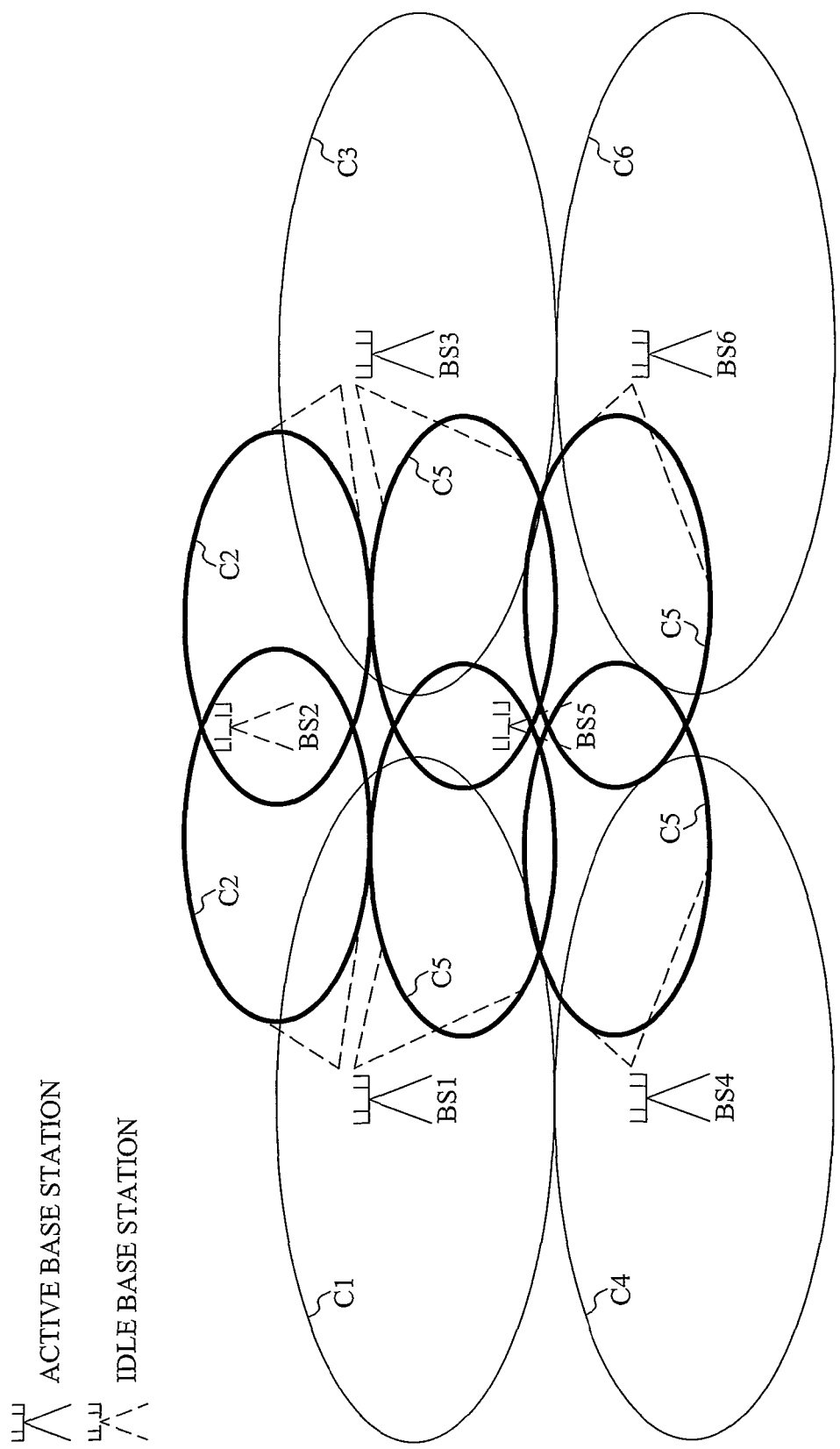
FIG. 4 a conceptual view illustrating how the areas normally managed by currently idle base stations are covered in accordance with the principles of the present invention.

FIG. 4 is a conceptual view illustrating how the areas normally managed by currently idle base stations are covered in accordance with the principles of the present invention. Instead of just extending the coverage area of active base stations, these base stations take over the identities of the cells normally served by the currently idle base stations and transmits necessary cell identity information, such as synchronization symbols, pilot signals and broadcast information, i.e. information needed for terminals to detect and camp on the cell. The information forming the cell identity depends on the type of cellular system (for instance WCDMA/HSPA or LTE). In this way terminals camping in the coverage area of an idle cell will camp on an emulated cell, having the same cell identity as the idle cell, but with the cell identity being transmitted from one or more other base station. If the propagation environment is favorable the coverage of the idle base station coverage may be taken over by a single active base station. Alternatively, several base stations can be used for the target to cover substantially the same (approximately the entire) idle base station coverage area, as shown in FIG. 4. In this case, base stations BS1, BS3, BS4, and BS6 will each cover parts of the coverage area of the idle cell C5, and the combined coverage from all sub areas is substantially the same as the coverage for the idle cell C5 when activated. In the same way base stations BS1 and BS3 will cover the coverage area of the idle cell C2. The emulated cell areas are indicated by solid lines in FIG. 4.

Figure 5:
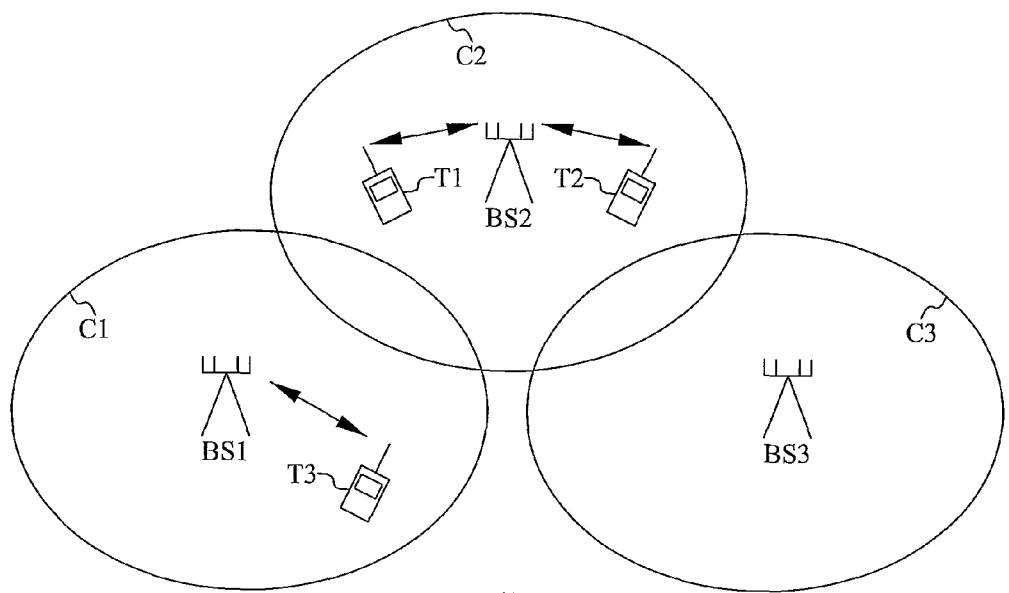
FIG. 5 a conceptual view illustrating a part of the cellular network in FIG. 1 with only active base stations.
Figure 6:
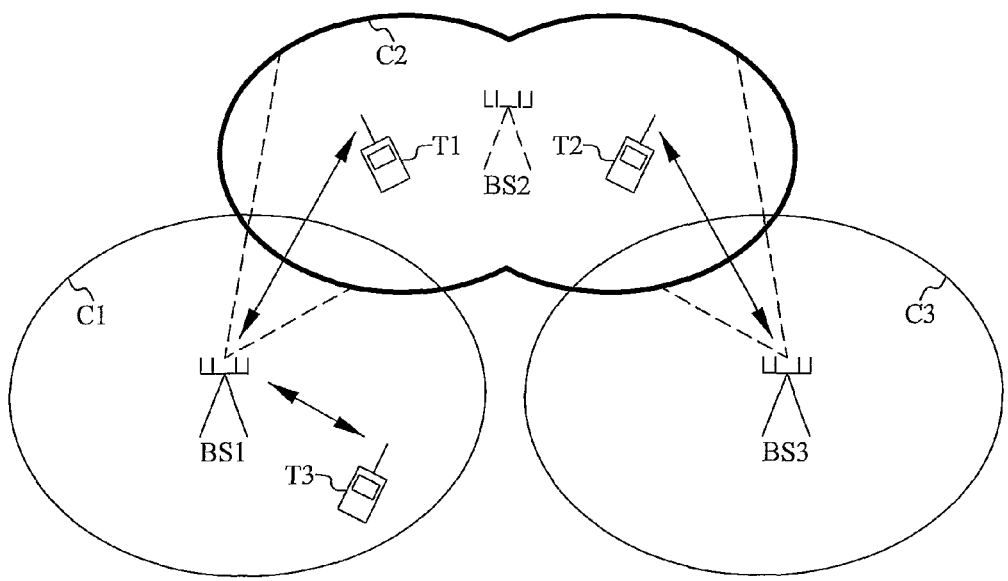
FIG. 6 a conceptual view illustrating the part of network illustrated in FIG. 5 with one base station in idle mode and its coverage area managed in accordance with the principles of the present invention.

FIGS. 5 and 6 give a less cluttered overview of embodiments herein. In FIG. 5 cells C1, C2, C3 are all managed by their own base stations BS1, BS2, BS3. This means that terminals T1, T2 in cell C2 are handled by the active base station BS2 and terminal T3 in cell C1 is handled by base station BS 1. In FIG. 6 base station BS2 has gone into an idle mode, and management of cell C2 has been handed over to base stations BS 1 and BS3, which both emulate the active mode of the currently idle base station BS2 in part of the cell area C2. Together they approximately cover the area of cell C2 in FIG. 5. Since base stations BS1 and BS3 transmit the same cell identity as base station BS2 in active mode, terminals T1, T2 will still communicate with cell C2, but the communication will now be managed by base stations BS 1 and BS3 instead of base station BS2. Terminal T3, which is in cell C1, is still handled by base station BS1. In a micro/macro cell scenario it may be sufficient to use only the base station that manages the macro cell to also manage approximately the entire micro cell when its base station goes idle.

Below will be describe procedures to hand over traffic from a "real cell" (FIG. 5) to an "emulated cell" (FIG. 6) such that a base station can go to an idle mode in low traffic load scenarios, as well as procedures for detecting the need to "wake up" idle base stations and procedures to hand over traffic from the emulated cell to the real cell.

"Go to sleep" procedure: As described above, FIG. 5 shows a part of cellular system including a number of active base stations BS1, BS2, BS3 and a number of terminals T1, T2, T3. These terminals may be turned on but not active, which implies that they only listen to paging messages transmitted for the cell they are camping on. They may also be active, i.e. involved in an active connection to the network, via one (or more in case a network/cellular system supports soft handover) serving base station. The total load in this part of the system is assumed low, and therefore there is a possibility to let one or more base stations go into idle mode ("sleep mode"), and let the remaining active base stations take over the small amount of traffic still existing in the area. In this example base station BS2 is about to go into idle mode. Since there may be some terminals camping on this cell as well as some connected active terminals, a controlled transition to idle mode is needed. Base station BS2 contacts neighboring base stations, via base station interfaces (X2, Iub, Iu, depending on standard: will be further described below), in order to inform them about its intention of going idle. Neighboring base stations are also informed about active terminals and the cell identity (dependent on the standard) of the cell to be emulated. In the example information about terminal T1 is fed from base station BS2 to base station BS1, and about terminal T2 to base station BS3. The neighboring base stations BS1, BS3 prepare for taking over the idle cell identity by using a hand shaking protocol, and at a certain agreed time instant the neighboring active base stations BS1, BS2 start to transmit the cell identity for cell C2. At the same time base stations BS1, BS2 take over the connection to active terminals. This completes the transition to FIG. 6. The transition is seamless from the terminals point of view, and hence a terminal still believes it is connected to cell C2. Furthermore, since the cell identity for cell C2 still is transmitted, but now from the sites serving cell C1 and C2 instead, idle terminals camping on cell C2 still believe they are camping on cell C2. By utilizing antenna systems, beam forming techniques can be used to beam form the cell identity transmitted from base stations BS1, BS3, so that the cell identity approximately only covers the area corresponding to the original cell C2.

"Wake up procedure": In FIG. 6 base station BS2 is in idle mode, and the cell identity of cell C2 is transmitted from neighboring base stations. The terminal T1 is assumed to be active and is connected to the emulated cell C2, i.e. the terminal is connected to cell C2 although the cell identity is transmitted from base station BS1. Another terminal T2 is assumed to be camping on the emulated cell C2, and is about to start a connection (using a RACH (LTE/eHSPA)). Base station BS3 is tuned to receive not only RACH from cell C3 but also from cell C2. At the same time, an active terminal T3 may be moving from cell C1 towards cell C2. From measurement reports sent from terminal T3 at regular intervals, base station BS1 is informed that the terminal is about to do a handover to cell C2. In a low load scenario base station BS1 can continue to emulate cell C2 and order a handover from cell C1 to emulated cell C2 and still receive the measurement reports from terminal T3 (however now under the cell identity C2). On the other hand, if due to an increased load on base station BS1, it is decided to wake up base station BS2 from the idle mode, base station BS1 contacts base station BS2 (and BS3) via the base station interface to indicate that cell C2 needs to be activated by base station BS2. Base stations BS1 and BS3 also inform base station BS2 about active terminals to take over. At a certain time instant base stations BS1, BS3 stop the cell identity transmission corresponding to C2 and base station BS2 starts to transmit the cell identity instead. Furthermore, base station C1 informs terminal T3 about the handover to cell C2 according to prior art techniques, and then terminal T3 performs a handover to cell C2. The system is now operation in according to FIG. 5 again.

From the description above it is noted that an active base station will typically not only transmit cell identities for their own cell (as conventional base stations usually do), but also simultaneously transmit cell identities for idle cells. By using antenna systems and beam forming techniques the cell identity of an emulated cell can be transmitted in a certain direction and hence in this way one can plan and use antenna directivity such that basically only the cell area of the idle base station is covered by the cell identity for the emulated cell. That means that a terminal within the coverage area of the idle cell will, due to the beam forming and antenna system used, measure stronger signal strengths (RSRP/RSCP, sync signals P-SCH, S-SCH etc) for the cell identity corresponding to the idle cell than for the neighboring cells. In a deployment setup where several cells are used for coverage of the emulated cell, the measured signal metrics of the emulated cell may be a combination of all the transmissions from the involved base stations (compare e.g. with MBSFN techniques in LTE and WCDMA where identical signals transmitted from multiple points are combined to improve the signal quality).

Figure 7:
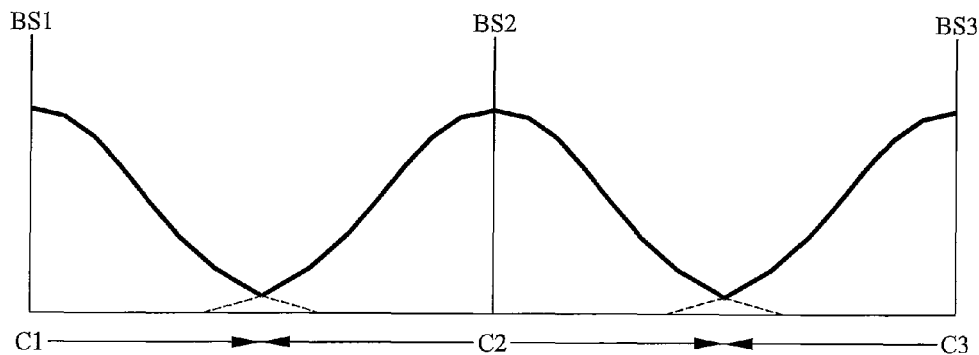
FIG. 7 is a diagram illustrating the power distribution in a part of a cellular network with three active neighboring base stations.
Figure 8:
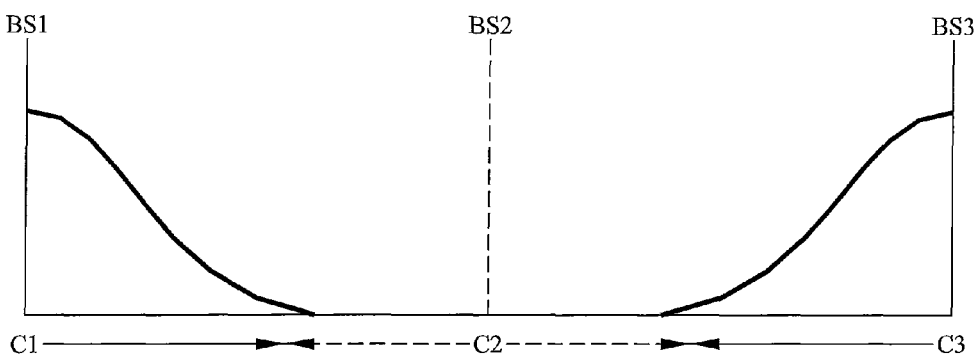
FIG. 8 is a diagram illustrating a power distribution similar to the one illustrated in FIG. 8 when one base station is in idle mode.
Figure 9:
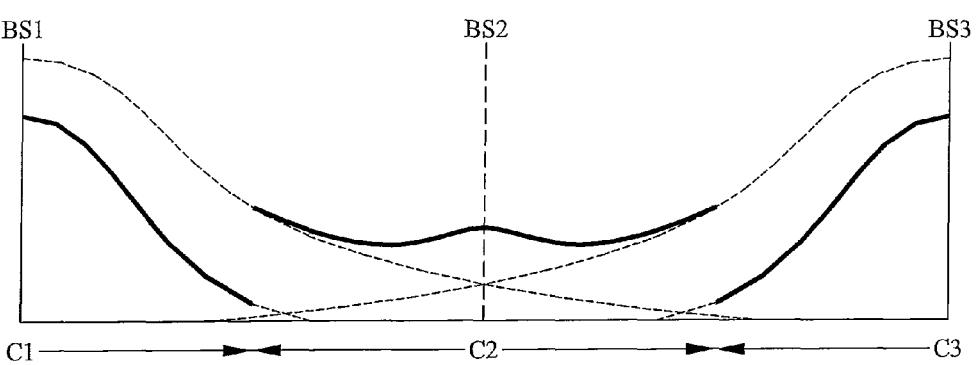
FIG. 9 is a diagram illustrating a power distribution similar to the one illustrated in FIG. 9, but with the cell of the idle base station emulated in accordance with an embodiment of the present invention.

The principles described in the previous paragraph are illustrated in FIG. 7-9.

FIG. 7 illustrates the power distribution in cells C1, C2, C3 in FIG. 5 when all base stations are active. It is evident that the power decreases with the distance from the respective base stations BS1, BS2, BS3. The solid lines show where each of the three signals is the strongest signal. In this case the power distribution is essentially the same around each base station.

FIG. 8 illustrates what would happen if base station BS2 would go idle with no further action. The signals around base station BS2 would simply vanish.

FIG. 9 illustrates the power distribution when the idle cell is emulated in accordance with an embodiment of the present invention. In this case beams are formed by base stations BS1 and BS3 and transmitted into cell C2. The power of these signals is illustrated by the dashed curves. At a first glance it seems that the dashed curves should be solid, since they represent stronger signals. However, it should be remembered that these curves represent the power of beams from antenna systems, which are typically designed and mounted to utilize the vertical beam shape to attenuate signals towards locations in the hosting cells C1 and C3, respectively. Thus, terminals in cells C1 and C3 will experience attenuated signal levels for signals directed towards cell C2, while terminals in cell C2 will experience a more or less un-attenuated signal level due to the vertical beam shape. In cell C2 the power from base station BS1 is added to the power from base station BS3 (they transmit the same cell identity, compare MBSFN transmission), and in this region the combined signal is the strongest signal, as illustrated by the solid curve in cell C2.

In order for a terminal to determine a cell and keep in sync with the network, a certain number of physical signals need to be transmitted. In general, the terminal needs some synchronization signals to synchronize with the system (P-SCH, S-SCH in WCDMA, primary/secondary synchronization signals in LTE), some kind of reference or pilot signals to measure the signal strength for the cell (CPICH for WCDMA, and reference signals transmitted in sub frames 0, 4, 5, 9 (FDD) from antenna port 0 in the middle 6 resource blocks for LTE) and to estimate the radio channel (used for data demodulation). Furthermore, the cell will also need to transmit broadcast information in order for a terminal to know parameters needed for setting up a connection. Depending on the cellular system, this information is transmitted on different physical channels (examples mentioned above). Hereinafter this information will be referred to as the cell identity. For example, in terms of the transmitted physical channels, the information included in the cell identity for WCDMA and LTE may be summarized as follows:

WCDMA
    synchronization channels P-SCH, S-SCH,
    pilot channel CPICH,
    paging channel PICH,
    broadcast channel P-CCPCH,
    S-CCPCH (in case some terminal is paged on PICH, data is then transmitted on S-CCPCH).

LTE
    Synchronization channels (PSS, SSS),
    Reference symbols (at positions mentioned in the previous paragraph),
    Broadcast information on DL-SCH, subframe 0 and 5,
    Paging information on DL-SCH.

In a preferred embodiment of the present invention the active base stations can handle, in addition to transmitting the cell identity of the emulated cell to terminals camping therein, a predetermined amount of traffic between terminals and the emulated cell. By using relevant parts of the cell identity (from layer 1 information, such as cell scrambling, to layer 3 information about security) from the idle cell, the emulated cell is able to support traffic, for example low rate services ("ping", VoIP etc), as well as connection requests, i.e. RACH initiated to the emulated cell. Then the idle cell does not have to be woken up just for handling small amount of data, as long as the active base stations have capacity to handle the data transmission and reception.

Preferably the invention includes the feature to "wake up" an idle cell and hand over traffic from the emulated cell to the real (woken up, activated) cell in case capacity problems are detected in the emulated cell.

A preferred embodiment also includes the feature of handing over terminals (from a base station point of view) from an active cell, for example C2 (FIG. 5), to the corresponding emulated cell C2 (FIG. 6). This enables base station BS2 to go idle and hand over the terminals to base stations BS1, BS3.

Figure 10:
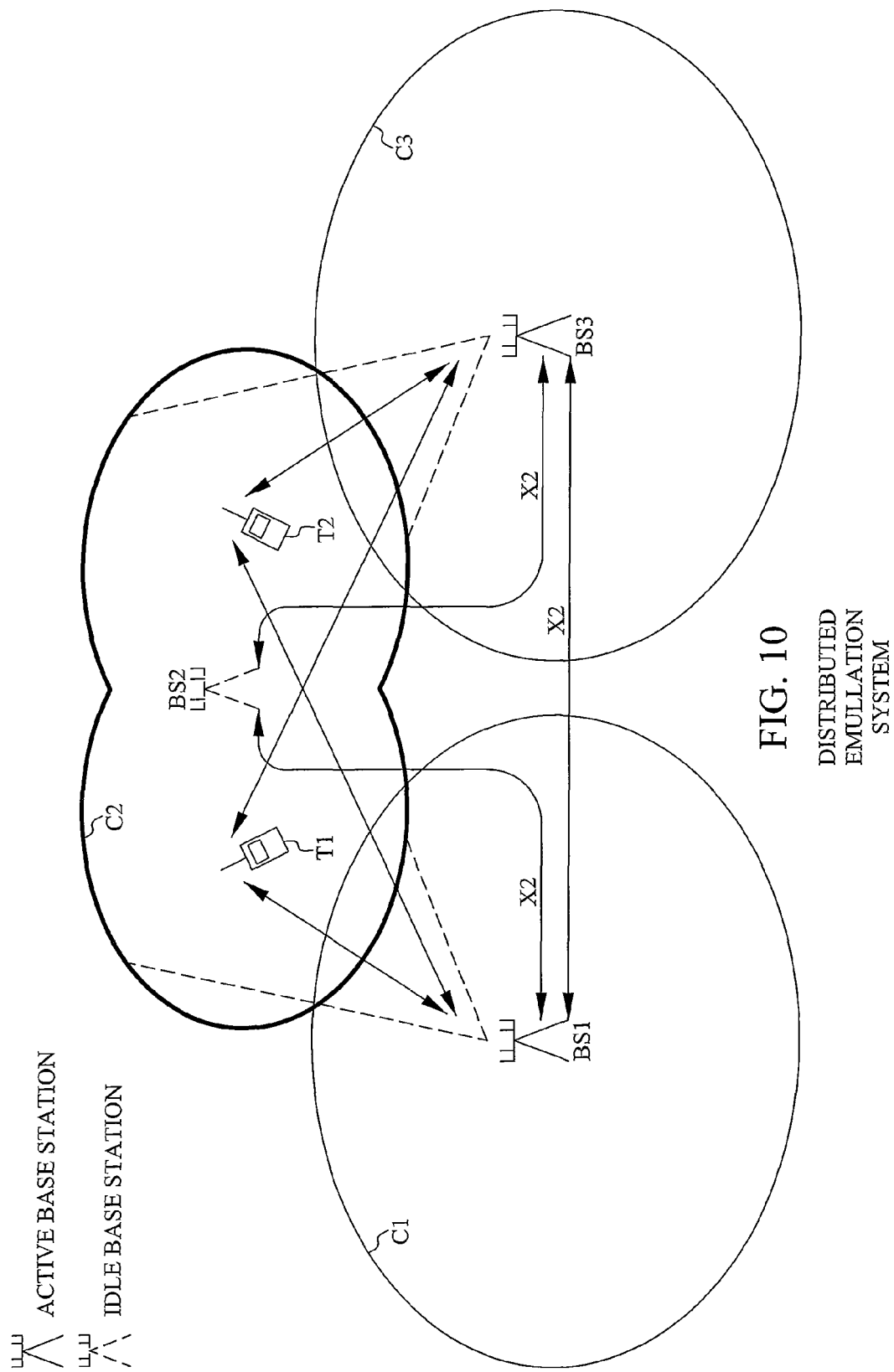
FIG. 10 a more detailed illustration of a part of a cellular network including an embodiment of the present invention.

FIG. 10 illustrates a part of a cellular network including an embodiment of the present invention. This embodiment will be referred to as a distributed emulation system, since the emulation is controlled by the base stations themselves over interfaces between them, for example the X2 interface in LTE. In the embodiment illustrated in FIG. 10 both base stations BS1, BS3 transmit/receive the same signals to/from cell C2 (indicated by the double communication arrows to each terminal T1, T2. This will give the power distribution of FIG. 9 for both transmission of the cell identity and traffic data.

Figure 11:
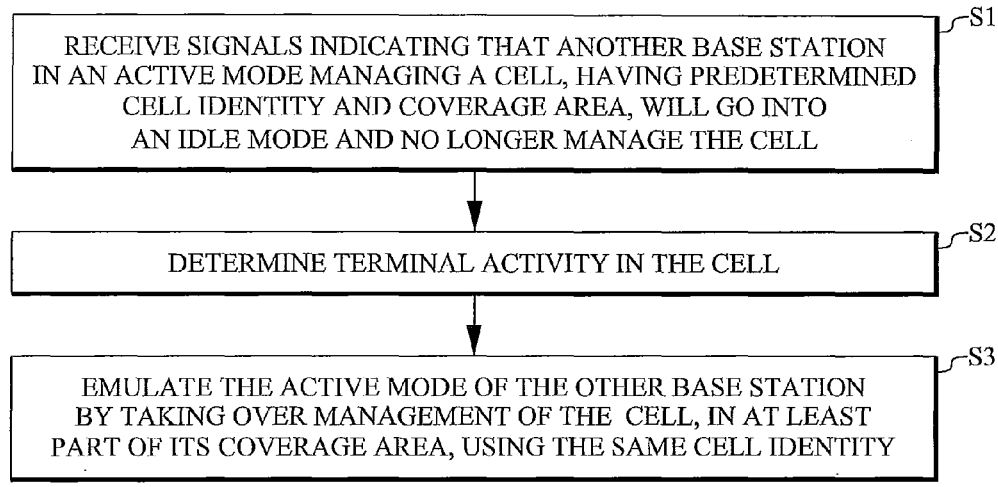
FIG. 11 is a flow chart illustrating an embodiment of the method in accordance with the present invention.

FIG. 11 is a flow chart illustrating an embodiment of the method in accordance with the present invention. Step S1 receives signals indicating that another base station in an active mode managing a cell, having a predetermined cell identity and coverage area, will go into an idle mode and no longer manage the cell. Step S2 determines terminal activity in the cell. Step S3 emulates the active mode of the other base station by taking over management of the cell, in at least part of its coverage area, using the same cell identity.

Figure 12:
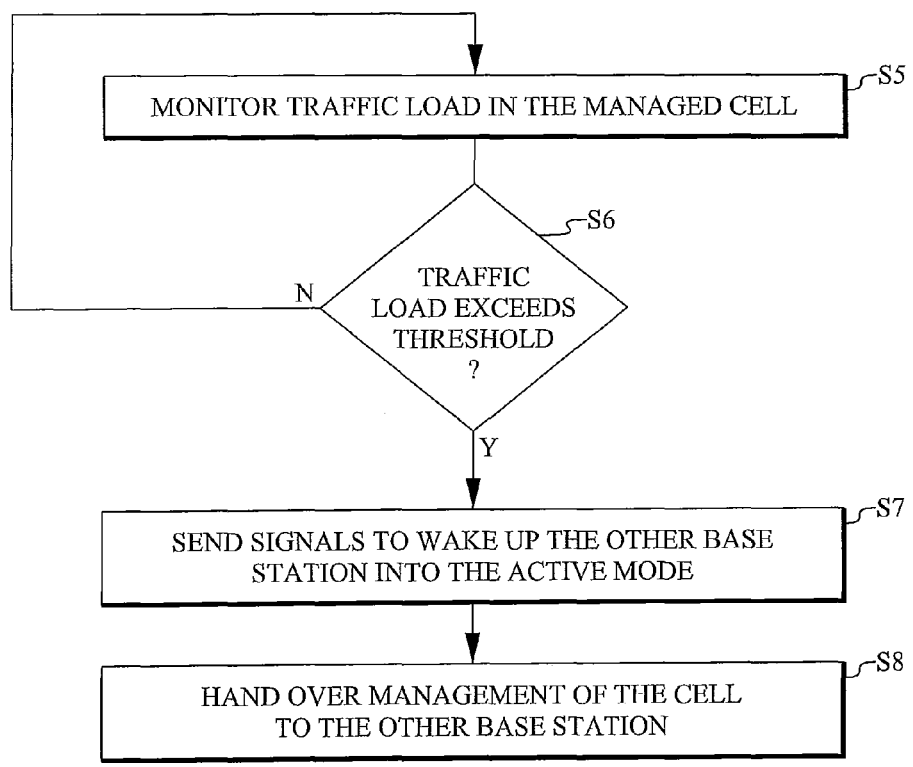
FIG. 12 is a flow chart illustrating further details of an embodiment of the method in accordance with the present invention.

FIG. 12 is a flow chart illustrating further details of an embodiment of the method in accordance with the present invention. Here the cellular network is assumed to be in a state in which a cell is emulated, for example as illustrated in FIG. 10. Step S5 monitors traffic load in an emulated or managed cell. Step S6 determines whether this traffic load exceeds a predetermined threshold. If so, step S7 sends signals to wake up the other base station, for example BS2 in FIG. 10, into the active mode. If not, monitoring of traffic is continued in step S5. After step S7 management of the emulated cell is handed over to the other base station in step S8.

The threshold may be set either on the downlink or on the uplink (different thresholds for downlink and uplink). Another alternative is to monitor both the downlink and the uplink and initiate a wake up of the idle base station if at least one of the thresholds is exceeded.

Figure 13:
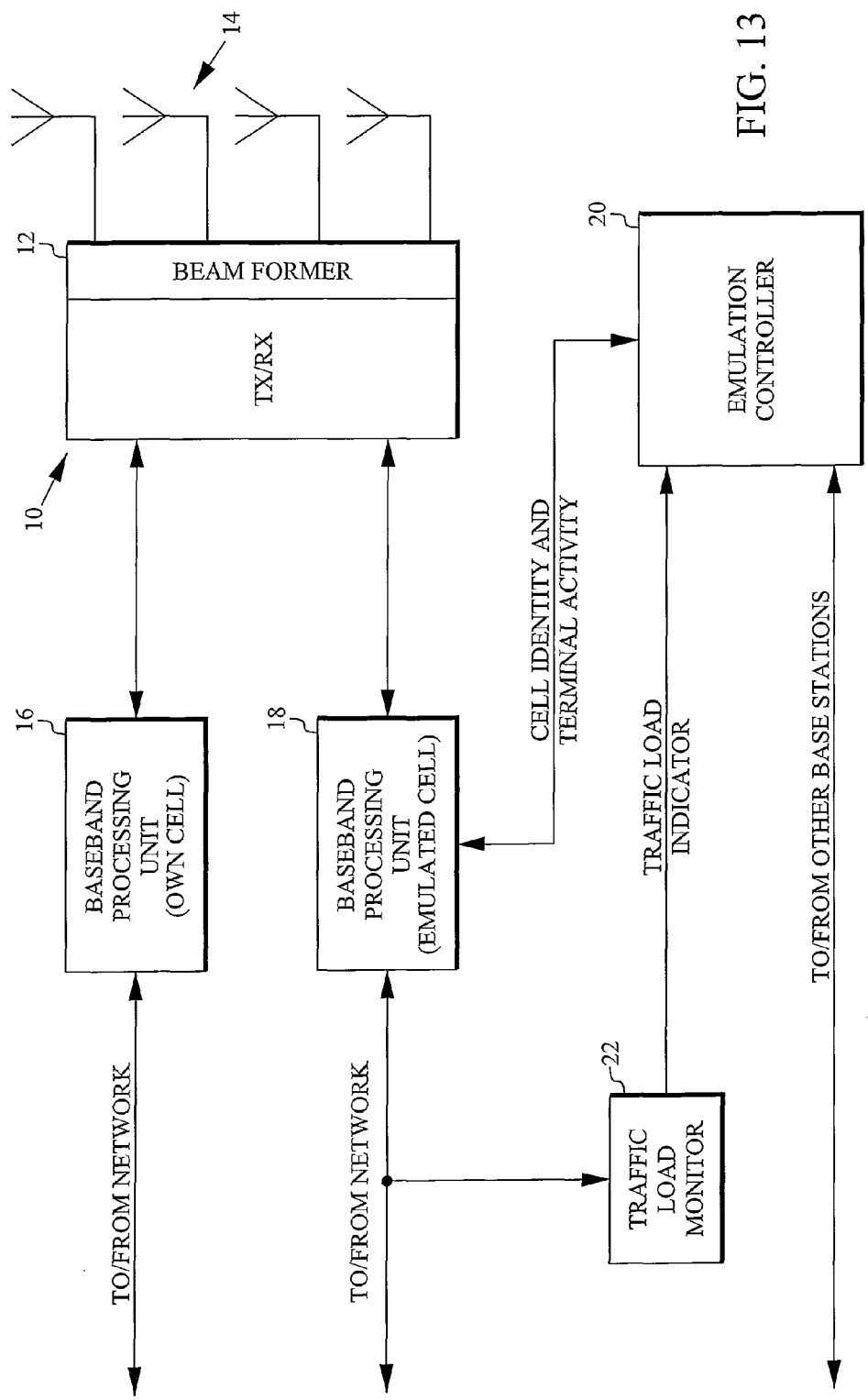
FIG. 13 is a block diagram illustrating an embodiment of a base station in accordance with the present invention.

FIG. 13 is a block diagram illustrating an embodiment of a base station in accordance with the present invention. A radio front end 10 includes a transceiver TX/RX and a beam former 12 connected to a set 14 of antennas. The radio front end is connected to at least one baseband processing unit 16 for handling traffic to/from one or more cells normally managed by the base station. The radio front end is also connected to at least one baseband processing unit 18 for handling traffic to/from one or more cells to be emulated by the base station. Furthermore, the base station includes an emulation controller connected to other base stations, for example over the X2 interface in LTE. When a base station goes idle it sends an emulation request, the cell identity and terminal activity information (identities of terminals camping in the cell, connection information on active terminals in the cell) to emulation controller 20 over this interface. The emulation controller forwards the information on cell identity and terminal activity to baseband processing unit 18 to initiate the cell emulation. The cell identity is, in addition to being transmitted, used to control the beam forming pattern produced by beam former 12. For example, beam former 12 may include a table of beam forming patterns, each pattern being associated with the cell identity of one of the surrounding cells. A connection to/from base band processing unit 18 and the network is connected to a traffic load monitor 22, which determines the current traffic load in the emulated cell and forwards a traffic load indicator to emulation controller 20. When the traffic load exceeds a predetermined threshold, emulation controller 20 is notified and turns off the cell emulation, wakes up the idle base station and hands over the management of the cell to the woken up base station over the base station interface. The terminal activity from the emulated cell (it may have changed during the emulation time period) is obtained from baseband processing unit 18.

The functionality of the various blocks in FIG. 13 is typically based on one or several micro processors or micro/signal processor combinations and corresponding software. Blocks 20, 22 may be integrated into baseband processing unit 18.

Further embodiments of the present invention will be described with reference to FIG. 14-18.

Figure 14:
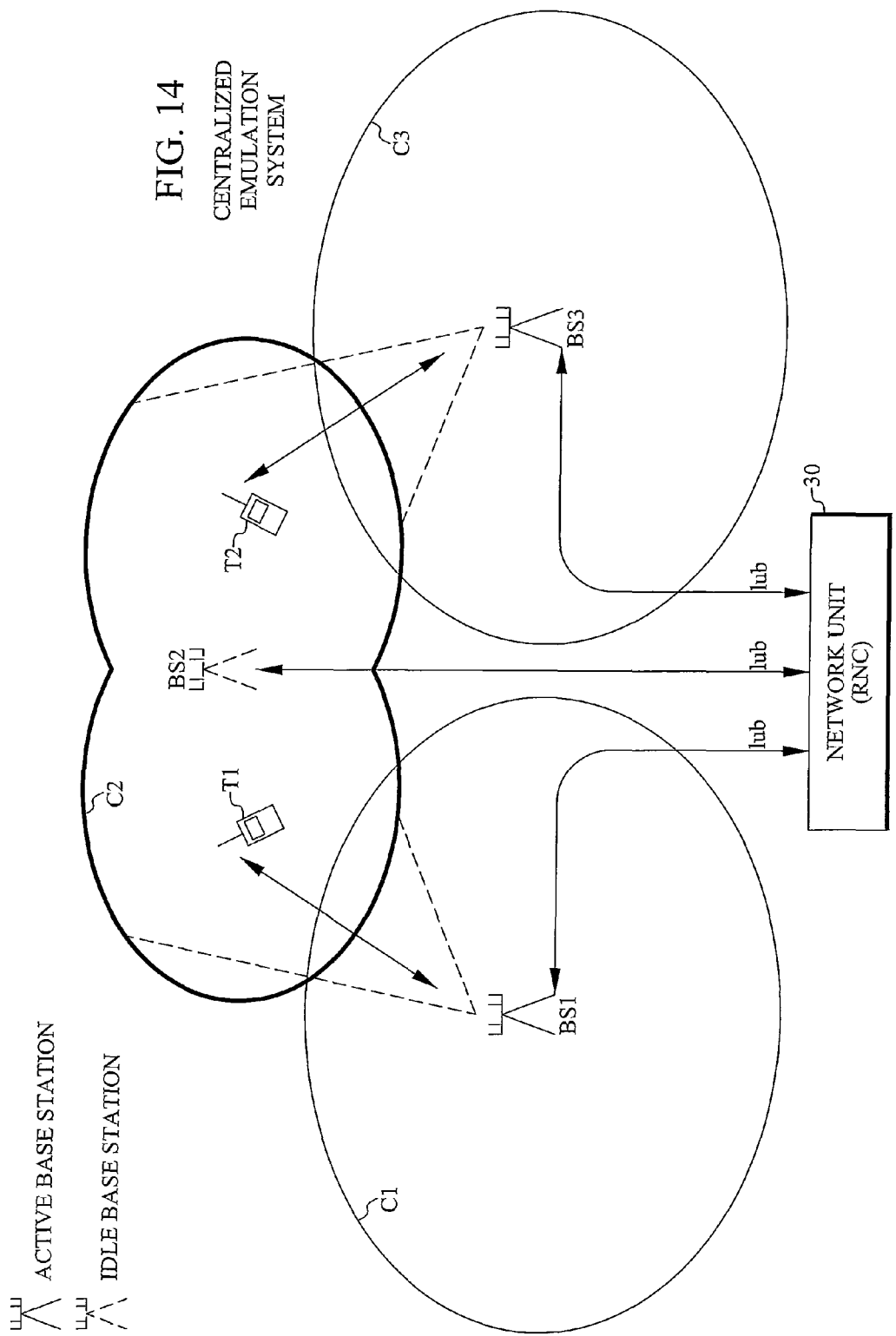
FIG. 14 a more detailed illustration of a part of a cellular network including another embodiment of the present invention.

FIG. 14 illustrates a part of a cellular network including another embodiment of the present invention. This embodiment will be referred to as a centralized emulation system, since the emulation is controlled by a network unit 30, for example an RNC. In the embodiment illustrated in FIG. 14 base stations BS1, BS2 and BS3 are connected to network unit 30 over a base station interface, for example the Iub interface between an RNC and NodeBs. This embodiment will be described with an alternative power distribution, in which base stations BS1, BS3 are in active communication with terminals in emulated cell C2 only within their respective coverage areas. This will give the power distribution of FIG. 15 for transmitted traffic data, where the power from base stations BS1, BS3 is not combined (the cell identity is still transmitted by both base stations and has the same power distribution as in FIG. 9). An advantage of such an embodiment is a further reduction in the total energy consumption in the cellular network, since only one base station needs to transmit (and receive) data traffic to each terminal in emulated cell C2.

Figure 16:
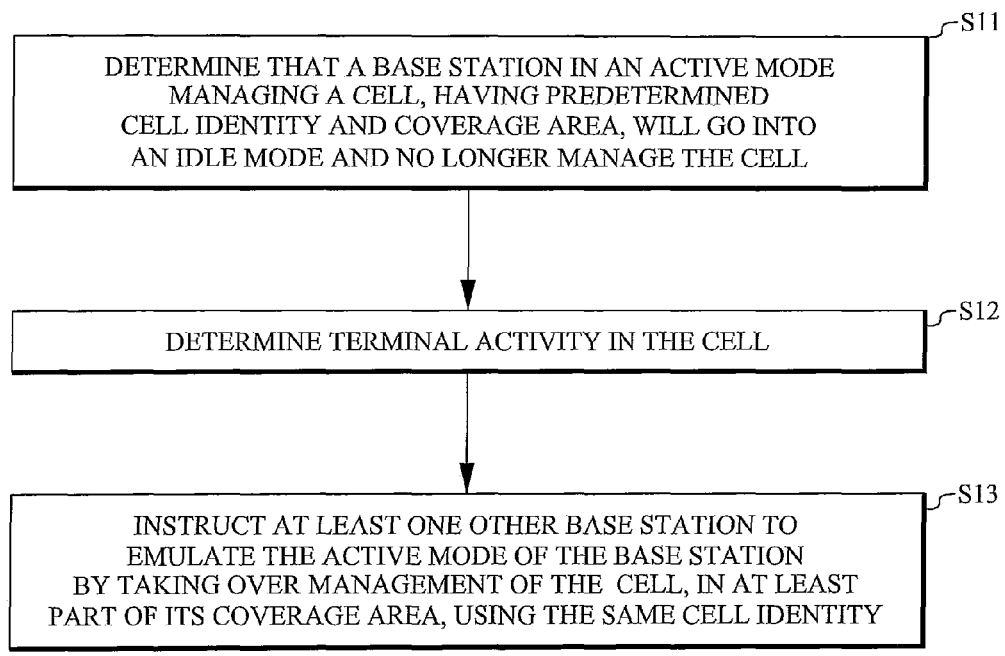
FIG. 16 is a flow chart illustrating another embodiment of the method in accordance with the present invention.

FIG. 16 is a flow chart illustrating another embodiment of the method in accordance with the present invention. This embodiment is suitable for the embodiment illustrated in FIG. 14. Step S11 determines that a base station in an active mode managing a cell, having a predetermined cell identity and coverage area, will go into an idle mode and no longer manage the cell. This can be achieved by receiving signals from the base station or by detecting that the traffic load in the cell is low. Step S12 determines terminal activity in the cell. Step S13 instructs at least one other base station to emulate the active mode of the first mentioned base station by taking over management of the cell, in at least part of its coverage area, using the predetermined cell identity.

Figure 17:
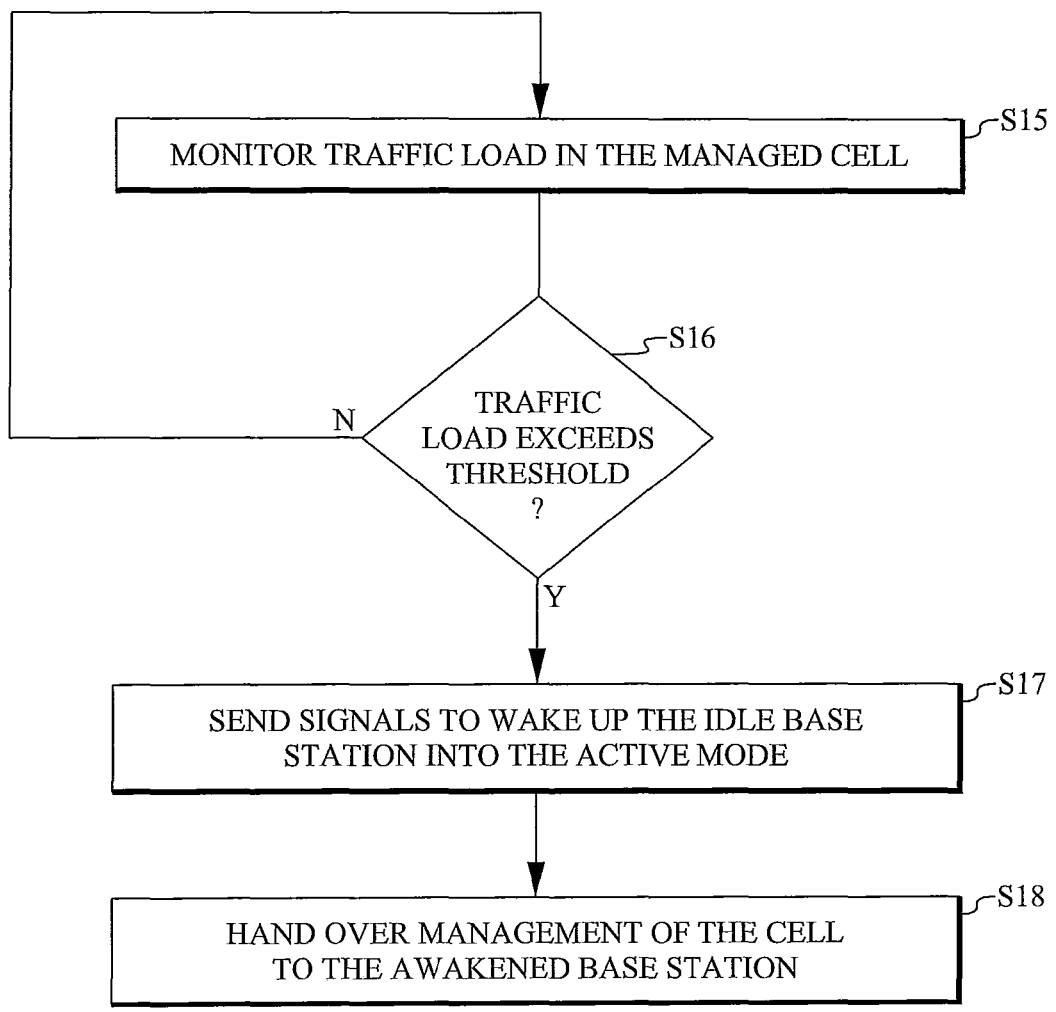
FIG. 17 is a flow chart illustrating further details of another embodiment of the method in accordance with the present invention.

FIG. 17 is a flow chart illustrating further details of another embodiment of the method in accordance with the present invention. Here the cellular network is assumed to be in a state in which a cell is emulated, for example as illustrated in FIG.

Figure 15:
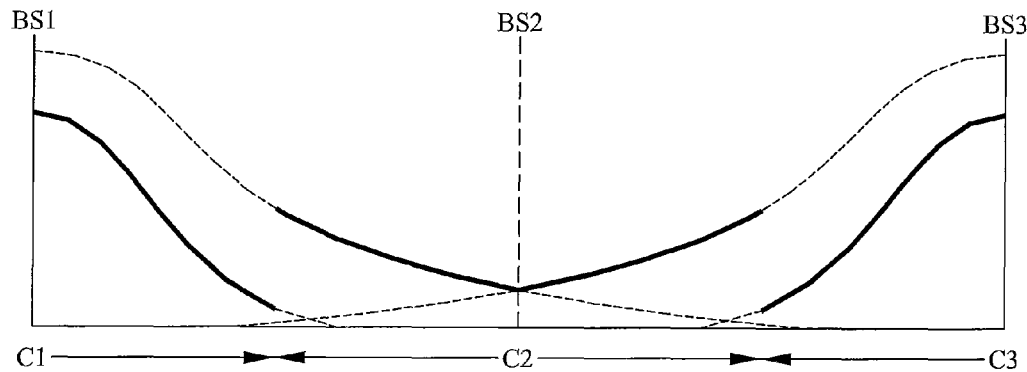
FIG. 15 is a diagram illustrating a power distribution similar to the one illustrated in FIG. 9, but with the cell of the idle base station emulated in accordance with another embodiment of the present invention.

14. Step S15 monitors traffic load in an emulated or managed cell. Step S16 determines whether this traffic load exceeds a predetermined threshold. If the threshold is exceeded so, step S17 sends signals to wake up the idle base station, for example BS2 in FIG. 14, into the active mode. If not, monitoring of traffic is continued in step S15. After step S17 management of the emulated cell is handed over to the awakened base station in step S18. If the traffic power distribution in FIG. 15 is implemented, where terminals are in active communication with only one of the emulating base stations, there are several possibilities for monitoring the traffic load. A first possibility is to monitor the sum of traffic loads to the emulated cells and compare this to a first threshold. Another possibility is to monitor the traffic load to each emulating base station individually, and compare each traffic load to an individual threshold for each base station. In this case the idle base station may be woken up as soon as one of the emulation base stations is overloaded even if the combined traffic load does not exceed the first threshold.

Figure 18:
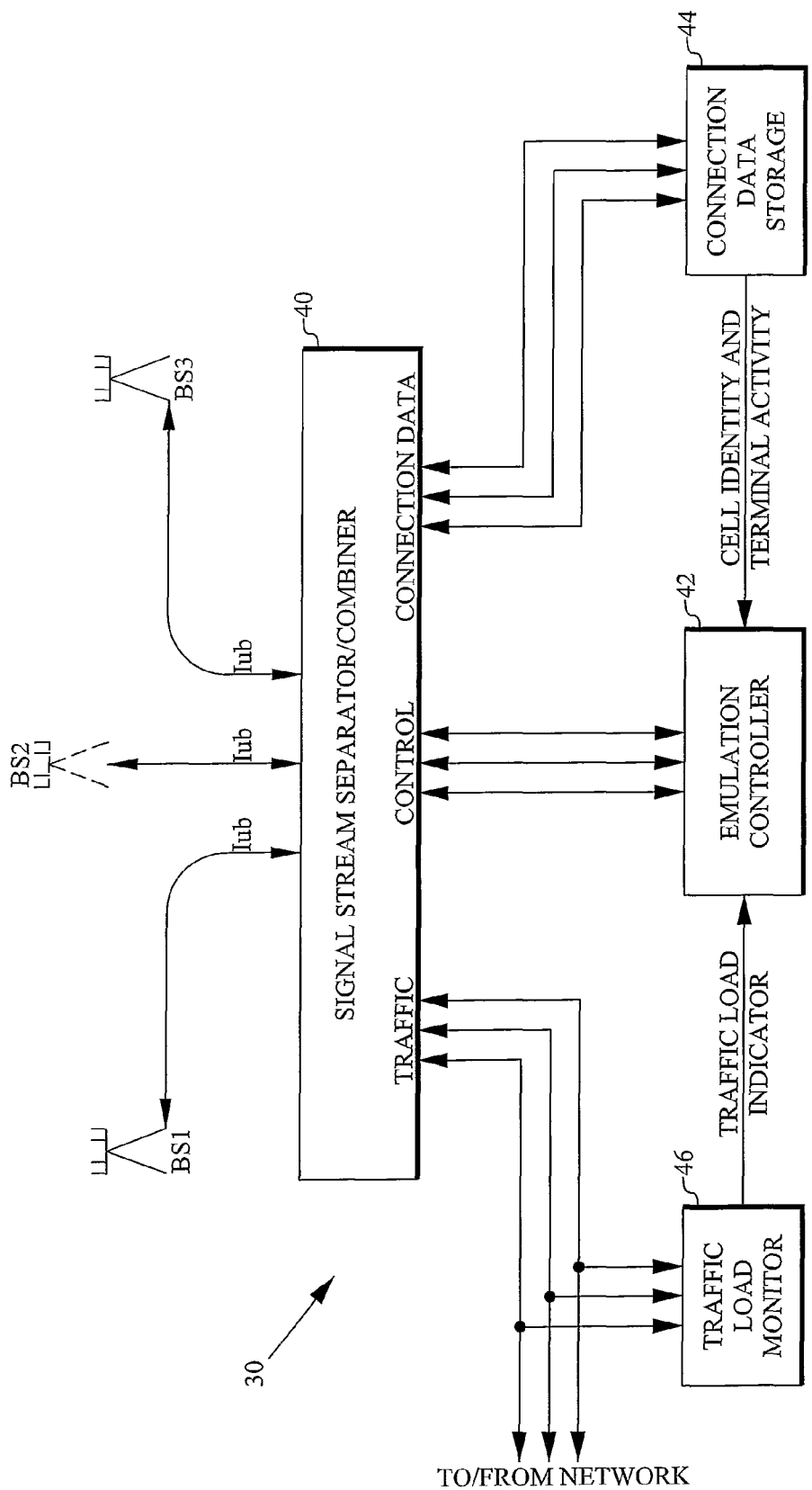
FIG. 18 is a block diagram illustrating an embodiment of a network unit in accordance with the present invention.

FIG. 18 is a block diagram illustrating an embodiment of a network unit in accordance with the present invention. This unit will be described with reference to the scenario illustrated in FIG. 14 and may be implemented in an RNC. Network unit 30 includes a signal stream separator/combiner 40 connected to base stations BS1, BS2, BS3 over an interface, such as the Iub interface. Signal stream separator/combiner 40 separates streams from the base stations into traffic, control and connection data streams. These streams are combined in the opposite direction. An emulation controller 42 instructs base stations BS1 and BS3 to emulate cell C2, which is normally covered by base station BS2, when the traffic load in that cell is low (as an alternative this may also be done when the total traffic load in the area covered by base stations BS1, BS2, BS3 is low). The necessary information is received from connection data storage 44, which receives and stores cell identities and terminal activity in the cells managed by the base stations connected to network unit 30. Emulation controller 42 uses this information for the cell that will go idle to instruct base stations BS1 and BS3 that they shall emulate cell C2 using its cell identity.

A traffic load monitor 46 monitors the traffic streams from the base stations connected to network unit 30. If the traffic load in base station BS2, is below a predetermined "low traffic" threshold, this is indicated to emulation controller 42, which instructs the base station to go idle and initiates emulation of the cell as described above. During emulation the emulated cell is also monitored with respect to traffic load, and if this traffic load exceeds a "high load" threshold (which may be higher than the "low traffic" threshold), this is indicated to emulation controller 42, which wakes up the idle base station and hands over the emulated cell for normal cell management.

Instead of monitoring traffic only in cell C2, it is also possible to monitor the total traffic in selected cells, for example cells C1, C2 and C3. In such an embodiment one of the base stations connected to the network unit is instructed to go idle if the total traffic load in the region covered by the cells is below a "total low traffic" threshold. Similarly, this base station is woken up if the total traffic load exceeds a "total high traffic" threshold (which may be higher than the "total low traffic" threshold). As previously described the thresholds may be set on the downlink, uplink or both links.

The functionality of the various blocks in FIG. 18 is typically based on one or several micro processors or micro/signal processor combinations and corresponding software.

Referring again to FIGS. 14 and 15, in this example terminal T1 is connected to its "closest" base station BS1 and terminal TS2 is connected to its "closest" base station BS2. The "closest" base station is actually the base station resulting in the strongest received signal at the respective terminal. This can be determined by ordering the terminals in an emulated cell to measure and report the signal strength from all detected neighbor cells. Thus, in the example one of the base stations BS1, BS3 will either be detected by terminals T1, T2 camping on the emulated cell) or will have the strongest reported RSRP (when connected). Since the reference signals of emulated cell C2 are transmitted by both base stations BS1, BS3, these signals can not be used to decide which base station is the strongest. However, since the emulating base stations also manage cells C1 and C3, the reference signals associated with these neighbor cells can be used to determine the strongest signal at the respective terminal. If uplink transmission is available from a terminal in the emulated cell, signal strength measurements may also be performed at the base stations to determine the "closest" base station. Either method or a combination of both methods may be used.

In a less complex embodiment it is of course the centralized control system operates with the same power distribution as in FIG. 9 also for connected terminals. On the other hand, if the functionality described in the previous paragraph is implemented in the base stations, the distributed control system may also generate the power distribution in FIG. 15 for connected terminals in the emulated cell.

It is important that the cell identity transmitted from active base stations seek to cover substantially the same area as the coverage areas of the cell they emulate. This can be done in several ways, as will be described below.

One way is to use antenna systems, i.e. base stations using multiple transmit antennas and beam forming techniques. Beam forming is based on multiple antenna element structures as e.g. antenna arrays with the ability of dynamically optimizing the selected coverage areas by creating beam forming directivity gain. Assume, for example, that cell base station BS1 in FIG. 4 is configured for LTE and supports up to four spatial multiplexing layers and has a correlated array antenna configuration (i.e. closely spaced co-polarized array elements), creating an additional ~6 dB directivity gain from the antenna for the emulated cell C2. By limiting transmission to the emulated cell C2 to a single layer, reconfiguring in the azimuth direction and utilizing the array for beam forming/beam shaping the left sub area C2 in FIG. 4 can be covered.

An alternative embodiment is to have a dedicated antenna array connected to a base station emulating a cell, where the number of array elements can be selected for the required gain.

Similar to beam forming in the azimuth described above, beam forming can also be performed in the vertical plane. One example is to generate different vertical tilt angles dedicated for different signal transmissions (emulated cells as well as own cells of the base station). If the increased complexity is acceptable, simultaneous beam steering in both azimuth and vertical planes is another possibility.

Alternatively, dedicated highly directive antennas connected to the emulating base station may be used to transmit and receive for the selected coverage areas during emulation. Examples are horn or dish type of designs supporting main beam opening angles down to 1-2 degrees in both azimuth and vertical planes independently and with achievable gains in the range of ~30-40 dBi (which should be compared to conventional base station antennas that usually support gains in the range of ~10-18 dBi).

The proposed invention makes it possible to improve the sleep functionality for base stations in a cellular system. By letting active base stations transmit cell identities of cells to be emulated, approximately only covering the area for the idle base station, it is much easier to keep track of terminals requesting resources. In case a terminal within the coverage area of an idle base station requests a lot of resources, this can be detected and hence the idle base station can be "woken up" in an efficient way only when really needed.

The invention will therefore allow efficient turn-off of base stations at times with lower traffic demand in coverage areas supporting higher traffic demands (e.g. planned for busy hour traffic), leading to substantial reductions in energy consumption at idle base stations by the ability to turn off almost all electronics at the base stations. The cost will of course be the energy consumption for the additional signals to transmit from the surrounding base stations to cover the emulated cell. This energy cost is, however, marginal in relation to the reductions, due to efficient antenna usage, as described above, and the fact that the basic energy consumption to keep a base station activated (even without transmissions) is a major part of the energy consumption. Thus, the invention enables a substantial reduction of total network energy consumption.

It will be understood by those skilled in the art that various modifications and changes may be made to the present invention without departure from the scope thereof, which is defined by the appended claims.

ABBREVIATIONS

BS Base Station
CPICH Common PIlot CHannel
dBi decibel isotropic
DL-SCH DownLink Shared CHannel
DRX Discontinuous Reception
DTX Discontinuous Transmission
eHSPA evolved HSPA
eNodeB evolved NodeB
HSPA High-Speed Packet Access
IP Internet Protocol
Iu Interface between RNC and core network
Iub Interface between a NodeB and an RNC
LTE Long-Term Evolution
MBSFN Multicast-Broadcast Single Frequency Network
NodeB A logical node handling transmission/reception in multiple cells
OSS Operations Support System
P-CCPCH Primary Common Control Physical CHannel
P-SCH Primary Synchronization CHannel
PICH Paging Indicator CHannel
PSS Primary Synchronization Signal
RACH Random Access CHannel
RNC Radio Network Controller
RSCP Received Signal Code Power
RSRP Reference Signal Received Power
S-CCPCH Secondary Common Control Physical CHannel
S-SCH Secondary Synchronization CHannel
SSS Secondary Synchronization Signal
UE User Equipment
VoIP Voice over IP
X2 Interface between eNodeBs in LTE

The invention claimed is:

1. A method of operating a base station, comprising:
receiving signals indicating that another base station will transition from an active mode in which that base station manages a cell, to an idle mode in which that base station no longer manages the cell, wherein the cell has a coverage area and a predetermined cell identity;
determining information about terminal activity in the cell; and
emulating the active mode of the other base station by taking over management of the cell, in at least part of its coverage area, using the predetermined cell identity, wherein said taking over includes the base station transmitting, using the predetermined cell identity, information that the other base station previously transmitted in the active mode but no longer transmits in the idle mode.

2. The method of claim 1, further comprising
monitoring traffic load in the cell when emulating the active mode of the other base station;
sending signals to wake up the other base station into the active mode when the traffic load exceeds a predetermined threshold; and
handing over management of the cell to the other base station.

3. The method of claim 1, wherein said emulating includes using beam forming in an antenna system with a plurality of antennas to cover at least part of the coverage area.

4. The method of claim 1, further comprising receiving signals from the other base station indicating the predetermined cell identity and said information about terminal activity in the cell.

5. The method of claim 1, further comprising receiving signals from a network unit indicating the predetermined cell identity and said information about terminal activity in the cell.

6. The method of claim 1, wherein the cell is a neighbor cell with respect to said base station.

7. The method of claim 1, wherein the cell is a micro cell.

8. The method of claim 1, wherein said taking over includes transmitting the predetermined cell identity from said base station instead of from said other base station.

9. The method of claim 1, wherein said taking over includes transmitting, using the predetermined cell identity, information based on which terminals detect and camp on the cell.

10. The method of claim 1, wherein said taking over includes transmitting, using the predetermined cell identity, at least one of a synchronization channel, a pilot channel, a paging channel, and a reference symbol.

11. A base station, comprising:
a processor and a memory, said memory containing instructions executable by said processor whereby the base station is configured to implement:
an emulation controller configured to:
receive signals indicating that another base station will transition from an active mode in which that base station manages a cell having a coverage area and a predetermined cell identity, to an idle mode in which that base station no longer manages the cell; and
determine information about terminal activity in the cell; and
a baseband processing unit connected to the emulation controller and configured to emulate the active mode of the other base station by taking over management of the cell, in at least part of its coverage area, using the predetermined cell identity, wherein said taking over includes the base station transmitting, using the predetermined cell identity, information that the other base station previously transmitted in the active mode but no longer transmits in the idle mode.

12. The base station of claim 11, wherein said memory contains instructions executable by said processor whereby the base station is configured to further implement a traffic load monitor connected to the emulation controller and configured to monitor traffic load in the cell when the emulation controller is emulating the active mode of the other base station, and wherein the emulation controller is further configured to:

send signals to wake up the other base station into the active mode when the traffic load exceeds a predetermined threshold; and hand over management of the cell to the other base station.

13. The base station of claim 11, wherein said memory contains instructions executable by said processor whereby the base station is configured to further implement a beam former controlling an antenna system with a plurality of antennas to cover at least part of the coverage area.

14. A method of operating a network unit controlling base stations in a cellular network, comprising:

determining that a first base station will transition from an active mode in which that base station manages a cell, to an idle mode in which that base station no longer manages the cell, wherein the cell has a coverage area and a predetermined cell identity;

determining information about terminal activity in the cell; and instructing at least a second base station to emulate the active mode of the first base station by taking over management of the cell, in at least part of its coverage area, using the predetermined cell identity, wherein said taking over includes at least the second base station transmitting, using the predetermined cell identity, information that the first base station previously transmitted in the active mode but no longer transmits in the idle mode.

15. The method of claim 14, further comprising:

monitoring traffic load in the cell when the at least second base station is emulating the active mode of the first base station;

sending signals to wake up the first base station into the active mode when the traffic load exceeds a predetermined threshold; and handing over management of the cell to the first base station.

16. The method of claim 14, further comprising:

monitoring total traffic load in selected cells managed by the network unit;

sending signals to wake up the first base station into the active mode when the total traffic load exceeds a predetermined threshold; and handing over management of the cell to the first base station.

17. A network unit configured to control base stations in a cellular network, comprising:

a processor and a memory, said memory containing instructions executable by said processor whereby the network unit is configured to implement:

an emulation controller configured to determine that a first base station will transition from an active mode in which that base station manages a cell, to an idle mode in which that base station no longer manages the cell, wherein the cell has a coverage area and a predetermined cell identity, and further configured to receive signals identifying terminal activity in the cell; and connection data storage connected to the emulation controller and configured to store the predetermined cell identity and information identifying said terminal activity;

wherein the emulation controller is further configured to instruct at least a second base station to emulate the active mode of the first base station by taking over management of the cell, in at least part of its coverage area, using the predetermined cell identity, wherein said taking over includes at least the second base station transmitting, using the predetermined cell identity, information that the first base station previously transmitted in the active mode but no longer transmits in the idle mode.

18. The network unit of claim 17, wherein said memory contains instructions executable by said processor whereby the network unit is further configured to implement a traffic load monitor connected to the emulation controller and configured to monitor traffic load in the cell when the emulation controller is emulating the active mode of the other base station, and wherein the emulation controller is further configured to:

send control signals to wake up the first base station into the active mode when the traffic load exceeds a predetermined threshold; and hand over management of the cell to the second base station.

19. The network unit of claim 17, wherein said memory contains instructions executable by said processor whereby the network unit is further configured to implement a traffic load monitor connected to the emulation controller and configured to monitor total traffic load in selected cells managed by the network unit, and wherein the emulation controller is further configured to:

send control signals to wake up the first base station into the active mode when the total traffic load exceeds a predetermined threshold; and hand over management of the cell to the second base station.

20. The network unit of claim 17, wherein the network unit is implemented in a radio network controller (RNC).

* * * * *